US012725295B2

(12) United States Patent
Zhang et al.

(10) Patent No.: US 12,725,295 B2
(45) Date of Patent: Sep. 1, 2026

(54) ADJACENT ITEM FILTERING FOR ACCURATE COMPARTMENT CONTENT MAPPING

(71) Applicant: Walmart Apollo, LLC, Bentonville, AR (US)

(72) Inventors: Han Zhang, Allen, TX (US); Siddhartha Chakraborty, Kudghat (IN); Avinash Madhusudanrao Jade, Bangalore (IN); Lingfeng Zhang, Flower Mound, TX (US); Zhaoliang Duan, Frisco, TX (US); Eric W. Rader, Plano, TX (US); William Craig Robinson, Centerton, AR (US); Mingquan Yuan, Flower Mound, TX (US); Abhinav Pachauri, Bangalore (IN); Benjamin Ellison, San Francisco, CA (US); Ishan Arora, Karnataka Country-India Pin (IN); Raghava Balusu, Achanta (IN); Ashlin Ghosh, Kerala (IN); Rongdong Chai, Allen, TX (US); Ketan Shah, Bentonville, AR (US); Paul Lobo, Mumbai (IN)

(73) Assignee: Walmart Apollo, LLC, Bentonville, AR (US)

( * ) Notice: Subject to any disclaimer, the term of this patent is extended or adjusted under 35 U.S.C. 154(b) by 324 days.

(21) Appl. No.: 18/403,048

(22) Filed: Jan. 3, 2024

(65) Prior Publication Data

US 2025/0218029 A1 Jul. 3, 2025

(51) Int. Cl.

| | |
|---|---|
| ***G06T 7/73*** | (2017.01) |
| ***G06V 20/52*** | (2022.01) |
| ***G06V 30/14*** | (2022.01) |

(52) U.S. Cl.
CPC ................ *G06T 7/73* (2017.01); *G06V 20/52* (2022.01); *G06V 30/1444* (2022.01)

(58) Field of Classification Search
None
See application file for complete search history.

(56) References Cited

U.S. PATENT DOCUMENTS 11,748,700 B2 9/2023 Jacobus et al.
11,798,064 B1 * 10/2023 Rodriguez ......... G06Q 30/0639
(Continued)

OTHER PUBLICATIONS

Kita, Yasuyo et al. "Detection and localization of pallets on shelves using a wide-angle camera", Dec. 2019 DOI: 10.1109/ICAR46387.2019.8981612 Conference: 2019 19th International Conference on Advanced Robotics (ICAR), 8 pages.
(Continued)

*Primary Examiner* — Soo Shin
(74) *Attorney, Agent, or Firm* — Foley IP Law, PLLC

(57) ABSTRACT

Examples provide a system for filtering the contents of adjacent item storage compartments from item recognition results obtained using computer vision (CV) for more accurate mapping of item locations within a retail environment. A filter manager selects a vertical member and tracks it throughout a series of images generated by an image capture device. The selected vertical member defines at least a portion of a target compartment in each image. The vertical member can be a display case door or a vertical steel bar defining the side of an item storage compartment. A set of adjacent items located on each side of the target compartment is filtered from the item recognition results. The target compartment location is determined based on a location tag of the target compartment. The items remaining after filtering are mapped to the target compartment location while reducing CV item location false positives.

20 Claims, 12 Drawing Sheets

(56) References Cited

U.S. PATENT DOCUMENTS

| | | | | |
|---|---|---|---|---|
| 2012/0126000 | A1* | 5/2012 | Kunzig | G06T 7/73 235/385 |
| 2014/0232826 | A1 | 8/2014 | Halata | |
| 2020/0286032 | A1* | 9/2020 | Bogolea | G05D 1/0282 |
| 2021/0349468 | A1 | 11/2021 | Bukhari et al. | |
| 2022/0058425 | A1 | 2/2022 | Savvides et al. | |
| 2023/0421705 | A1* | 12/2023 | Bogolea | H04N 23/60 |

OTHER PUBLICATIONS

Sharma, Kartik Umesh et al. "An Approach For Single Object Detection In Images" International Journal of Image Processing (IJIP), vol. (8) : Issue (5) : 2014, pp. 278-293, 16 pages.

Welsh, John "Developing a Pallet Detection Model Using OpenUSD and Synthetic Data", https://developer.nvidia.com/blog/developing-a-pallet-detection-model-using-openusd-and-synthetic-data/, Jul. 18, 2023, 18 pages.

* cited by examiner

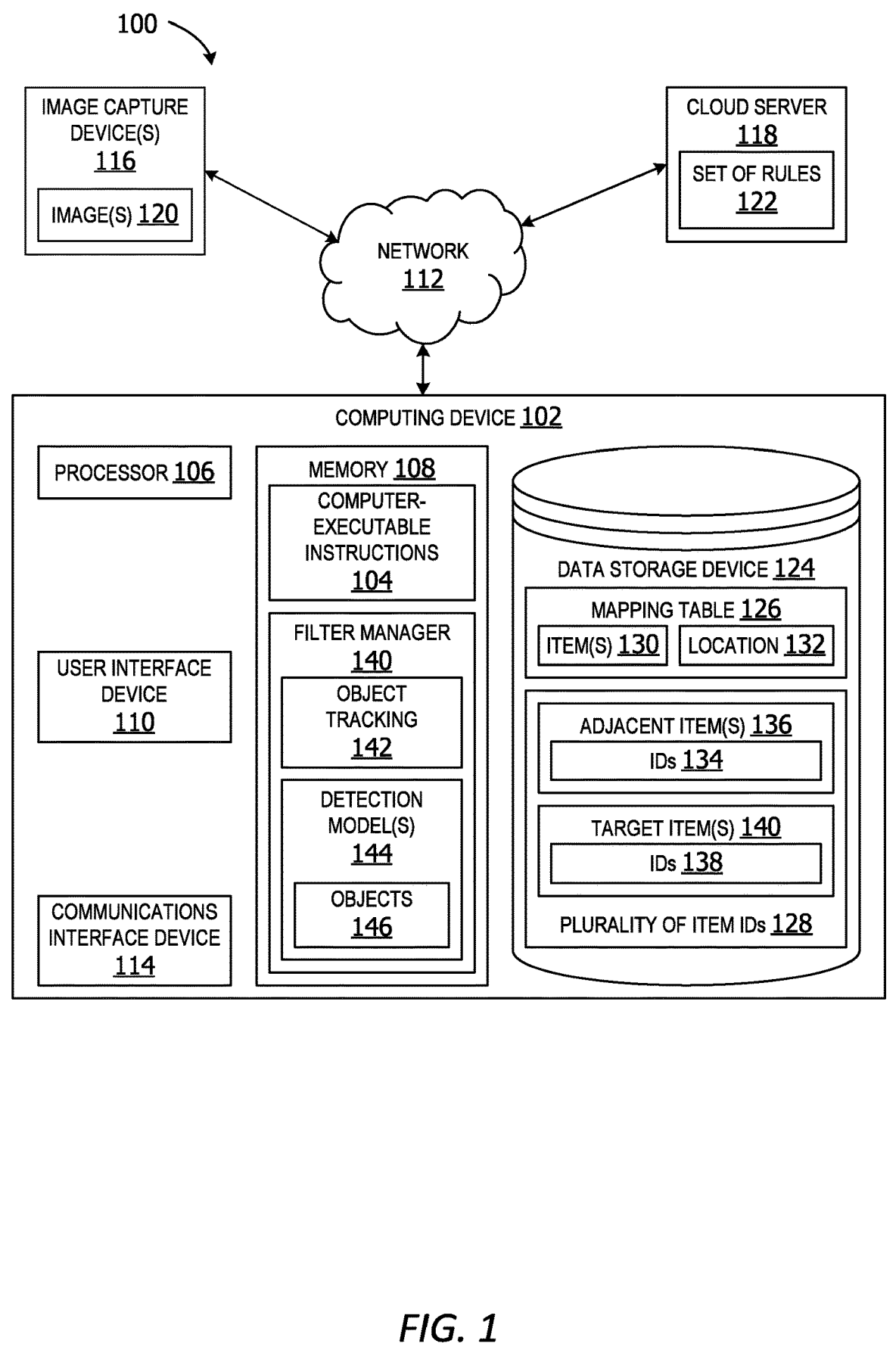

100

IMAGE CAPTURE DEVICE(S) 116
IMAGE(S) 120

CLOUD SERVER 118
SET OF RULES 122

NETWORK 112

COMPUTING DEVICE 102

PROCESSOR 106

MEMORY 108
COMPUTER-EXECUTABLE INSTRUCTIONS 104
FILTER MANAGER 140
OBJECT TRACKING 142
DETECTION MODEL(S) 144
OBJECTS 146

DATA STORAGE DEVICE 124
MAPPING TABLE 126
ITEM(S) 130
LOCATION 132
ADJACENT ITEM(S) 136
IDs 134
TARGET ITEM(S) 140
IDs 138
PLURALITY OF ITEM IDs 128

USER INTERFACE DEVICE 110

COMMUNICATIONS INTERFACE DEVICE 114

FIG. 1

MAPPING DATA 700

| BIN 01 | BIN 02 | BIN 03 | BIN 04 | BIN 05 | BIN 06 |
|---|---|---|---|---|---|
| PALLET ID 01 | PALLET ID 03 | PALLET ID 06 | PALLET ID 09 | PALLET ID 10 | PALLET ID 12 |
| PALLET ID 02 | PALLET ID 04 | PALLET ID 07 | | PALLET ID 11 | PALLET ID 13 |
| | PALLET ID 05 | PALLET ID 08 | | | PALLET ID 14 |

FIG. 7

ADJACENT ITEM FILTERING FOR ACCURATE COMPARTMENT CONTENT MAPPING

BACKGROUND

Computer vision (CV) item recognition as a service (IRAS) is frequently used to analyze images of objects within a store or other retail facility to automatically identify products, signs, location tags, shelving, and other objects of interest. Products and location tags identified using CV are used for updating inventory and planograms for use in locating products in a store. However, the item and location recognition are frequently inaccurate due to false positives in CV results incorrectly mapping items to the wrong locations and/or failing to correctly identify items within a specific location. In such cases, users can verify the CV results to correct errors by walking the aisles and visually inspecting products to manually correct these errors. However, many large stores, warehouses and distribution centers may contain thousands of products and pallets of products, making manual verification unscalable. Moreover, this is an inefficient, time-consuming, and potentially cost prohibitive process.

SUMMARY

Some examples provide a system for adjacent item filtering for accurate location mapping. An image capture device generates one or more images of an item storage compartment including a plurality of items. Item identifiers (IDs) for the items are identified by a tag detection model using the one or more images. Vertical members of the item storage compartment are identified by a vertical member detection model using the one or more images. The vertical members define compartments of the item storage structure. The compartments include a target compartment. A target vertical member of the target compartment is selected. A set of adjacent items located to one side of the vertical member is identified. The set of adjacent items is filtered from the plurality of items. The set of adjacent items are located within an adjacent compartment in the plurality of compartments. A set of target items remaining after filtering is mapped to a location of the target compartment in an item-to-location mapping table.

Other examples provide a method for adjacent item filtering for more accurate item mapping. A filter manager obtains an image of an item storage structure having multiple compartments. The compartments include a items. Vertical members of the item storage compartment are identified in the image by a vertical member detection model. The vertical members define the compartments. A vertical member associated with a target compartment is selected. A set of adjacent items located to a selected side of the first vertical member within the image is filtered. The set of adjacent items are associated with an adjacent compartment. A set of target items associated with the target compartment is mapped to a location of the target compartment in an item-to-location mapping table.

Still other examples provide a computer storage device having computer-executable instructions stored thereon, which, upon execution by a computer, cause the computer to perform operations for filtering adjacent items. A plurality of items associated with a plurality of item IDs are identified within a plurality of images of an item storage structure, by a tag detection model. The plurality of images generated by an image capture device. A plurality of vertical members associated with the item storage compartment are identified within the plurality of images. The plurality of vertical members defines a plurality of compartments of the item storage structure. A vertical member associated with the target compartment is selected. A first set of items located to a selected side of the first vertical member is filtered from the plurality of items. The first set of items is associated with a first adjacent compartment in the plurality of compartments. A second set of items are mapped to a location of the target compartment in an item-to-location mapping table.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is an exemplary block diagram illustrating a system for adjacent item filtering using object detection and object tracking.

FIG. 7 is an exemplary block diagram illustrating mapping data associated with mapping items to compartments on an item storage structure.

Corresponding reference characters indicate corresponding parts throughout the drawings.

DETAILED DESCRIPTION

Figure 2:
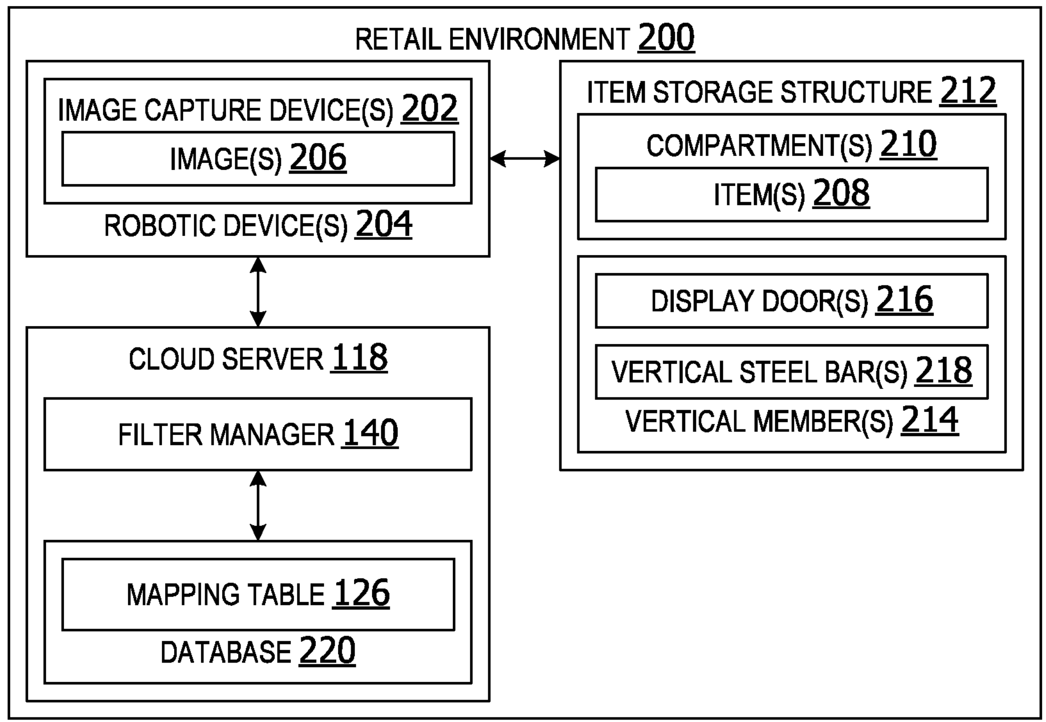
FIG. 2 is an exemplary block diagram illustrating a retail environment including image capture device(s) for capturing images used to filter adjacent items from object detection results.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Computer vision (CV) object detection models can be used to detect and recognize a variety of different types of objects of interest in digital images. For example, a pallet and pallet tag detection model can be used to detect pallets and other items in a store or other retail environment. However, it is difficult to identify the correct location of pallets and pallet tags using object detection on digital images because these models have difficulty differentiating the locations of different objects when the same objects appear in multiple images, the images are in gray scale, the images are captured at different angles, and other situations in which it is difficult for the detection models to accurately identify objects and object locations. Moreover, it can also be difficult for these systems to determine which bin a pallet is located in using multiple images of multiple bins.

Current models process images to detect pallets and tags coming from adjacent compartments along with those of the target compartments without distinguishing which compartment each item is located in. Reserve payload images usually contain images with adjacent compartment (bin) views. The image of a payload should focus on only one target compartment and only the pallet identifier (ID) from the target compartment should be added to the target bin location. When the CV models process these payload images, they detect pallets and tags coming from adjacent compartments along with those of the target compartment. This results in wrong pallet ID to location mapping and thus reduce pallet ID location accuracy. It further reduces the user's ability to locate desired items/pallets. Thus, a system that can automatically filter out the adjacent compartment item/pallet tag detections from the reserve area payload inference results is needed.

Referring to the figures, examples of the disclosure enable a filter manager that analyzes object detection and recognition results generated by CV item recognition as a service (IRAS) model results and differentiates whether an item or pallet in one or more images belongs to a target compartment on an item storage structure or an adjacent compartment and removes adjacent item detections. A compartment is a bin, interior of a display case, or other space associated with an item storage structure, such as shelving or display cases. This enables improved item-to-location mapping with fewer false positives.

In some examples, the system provides a filter manager having adjacent item filtering logic that combines vertical steel bar detections with image timestamps enabling vertical steel bar tracking across multiple images captured in series by a robotic image capture device. This enables the system to identify the same vertical steel bar or other object in multiple different images of the same item storage structure for improved item recognition accuracy and more reliable item-to-location mapping.

Other examples provide adjacent item filtering using pallet filtering logic for identifying adjacent bin pallets based on relative position of pallets to vertical steel bars in one or more images of the item storage structure including one or more pallet bins. This enables the system to filter adjacent bin pallet tag detections to reduce false positives and improve pallet selection.

The filter manager in other examples identifies a target display case door and tracks the target display case door within multiple images captured in series. The system filters items associated with the contents of display cases having adjacent display case doors. Only items within the target display case of the target door are mapped to the target display case location for improved display case occupancy determinations and item-to-location mapping accuracy.

In other examples, the system assigns a start type to a first vertical steel bar of the item storage structure and assigns an end type to a second vertical steel bar of the item storage structure. Items to the left side of the start type vertical steel bar are filtered out of the item detection results. Items to the right side of the end type vertical steel bar are filtered out of the item detection results. The remaining items are mapped to the location of the target compartment. This enables improved item-to-location mapping at the compartment level for increased granularity in location mapping and improved accuracy in the final mapping results.

The computing device operates in an unconventional manner by tracking a target vertical member associated with a target compartment and filtering items associated with adjacent compartments for improved accuracy and granularity in mapping results where items are mapped to a specific compartment or sub-section of a storage structure rather than simply mapping all items to the storage structure. This enables improved accuracy while reducing system resource usage expended during manual item-to-location mapping verification and corrections. In this manner, the computing device is used in an unconventional manner and allows reduced memory usage, reduced processor usage and reduced network bandwidth usage which would otherwise be expended in identifying inaccurate item-to-location mappings, as well as manually verifying and correcting erroneous mapping results and false positives, thereby improving the functioning of the underlying computing device.

The filter manager further enables item-to-location mapping with increased speed and efficiency where the system automatically identifies items at a bin level and/or per-display case level, for more precise mapping of items to locations within a retail environment. The mapping results are presented to a user via a user interface device for improved user efficiency via the UI interaction and increased user interaction performance with a reduced error rate.

Referring again to FIG. 1, an exemplary block diagram illustrates a system 100 for adjacent item filtering using object detection and object tracking. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 are performed by the processor 106, performed by multiple processors within the computing device 102 or performed by a processor external to the computing device 102. In some examples, the processor 106 is programmed to execute instructions such as those illustrated in the figures (e.g., FIG. 8, FIG. 9, FIG. 10, FIG. 11, and FIG. 12).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to an image capture device 116 and/or a cloud server 118, can occur using any protocol or mechanism over any wired or wireless connection. In some examples, the communications interface device 114 is operable with short range communication technologies such as by using near-field communication (NFC) tags.

The image capture device 116 is a device for generating one or more digital image(s) 120. The digital image(s) 120 include black-and-white (gray scale) images and/or color images. The digital image(s) 120, in some examples, include still images. In other examples, the digital image(s) 120 include video, such as multiple images generated in sequence. The image(s) 120 optionally include metadata, such as, but not limited to, a timestamp, an image capture device identifier (ID) identifying the image capture device that generated the image(s) 120, and/or location data indicating a location of the image capture device 116 when the image(s) 120 are created.

In these embodiments, the image(s) 120 are images of objects of interest. The images do not include users, human faces, or customers within the retail environment. Any images having human users, human faces, or other objects which are not of interest inadvertently included within the images are removed from the image(s) by cropping the images such that only objects of interest remain in the cropped images. Images of users or objects which are not of interest are deleted or otherwise discarded. The cropped images containing only the objects of interest are then analyzed to identify the objects of interest within the cropped images, such as, but not limited to, the items and/or the vertical members.

The image capture device 116 is implemented as a camera or other image capture device mounted to a robotic device in this example. However, in other embodiments, the image capture device 116 includes hand-held image capture devices, image capture devices mounted to a fixture, and/or image capture devices integrated within a computing device, such as a cellphone, tablet, smart glasses, or other mobile user device.

The cloud server 118 is a logical server providing services to the computing device 102 or other clients, such as, but not limited to, the image capture device 116 and/or a mobile user device (not shown). The cloud server 118 is hosted and/or delivered via the network 112. In some non-limiting examples, the cloud server 118 is associated with one or more physical servers in one or more data centers. In other examples, the cloud server 118 is associated with a distributed network of servers.

The cloud server 118 optionally includes a cloud storage for storing data remotely which is accessible to the computing device via the network 112. The cloud server 118, in this example, stores a set of rules 122 used to calibrate the image capture device 116, track objects within multiple images, filter adjacent items detected in the image(s), as well as any other rules.

The system 100 can optionally include a data storage device 124 for storing data, such as, but not limited to a mapping table 126 and/or a plurality of identifiers (IDs) 128 associated with a plurality of items identified within the image(s) 120. The mapping table 126 is an item-to-location mapping table for mapping one or more item(s) 130 to a location 132. The item(s) 130 includes individual items and/or pallets. The location 132 is a location of a specific compartment (sub-section) within an item storage structure. A single item storage structure is sub-divided into multiple compartments. A compartment is an enclosed or partially enclosed space, such as a bin, area beneath a shelf, area on a shelf, area next to a shelf, area within a display case, or any other section of a shelving unit for storing or displaying items within a retail environment.

The plurality of items IDs 128 includes item IDs 134 for a set of one or more adjacent item(s) 136 identified within one or more adjacent compartments on an item storage structure and/or the item IDs 138 for a set of one or more target item(s) identified within a target compartment on the same item storage structure.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 124 includes a database, such as, but not limited to, the database 220 in FIG. 2 below.

The data storage device 124 in this example is included within the computing device 102, attached to the computing device, plugged into the computing device, or otherwise associated with the computing device 102. In other examples, the data storage device 124 includes a remote data storage accessed by the computing device via the network 112, such as a remote data storage device, a data storage in a remote data center, or a cloud storage.

The memory 108 in some examples stores one or more computer-executable components, such as an adjacent item filter manager 140. The filter manager 140, when executed by the processor 106 of the computing device 102, performs object tracking 142. Object tracking enables the filter manager 140 to track a target object, such as a target display case door or a target vertical steel bar on an item storage structure, within multiple different images. A target object, such as a target display door, may appear at different angles, in different lighting and in different areas within each image. For example, a target door may be fully visible in the center of a first image, be visible in its entirety at the far right edge of a second image and be only partially visible and partially out of frame in a third image. The object tracking 142 enables the system to consistently identify the same door in every image regardless of the position, visibility, or percentage of the door which is shown in each image.

The object tracking 142 uses image timestamp data to identify the order in which images were captured by the image capture device. An image generated at a time 10:22:34 occurs earlier in a sequence than another image of the same compartment captured by the same image capture device 116 with a timestamp of 10:22:42. In this manner, the system determines the correct sequence in which images are generated. The sequence enables the filter manager to track the same object more accurately in images taken as the image capture device 116 moves in a given direction through the retail environment.

In other words, as the image capture devices moves in a given direction, the objects being captured in the images appear to move from a first edge of the images as the object first comes into frame, then centered as the image capture device continues moving, and finally the object appears near the second edge of the images before finally no longer being visible within the images as the targeted object is no longer in frame as the images are captured in sequence.

The filter manager 140 includes one or more object detection model(s) for detecting and recognizing one or more objects of interest in the image(s) 120. The object detection model(s) 144 are deep learning CV models trained using customized, hand-labeled training data to recognize the objects 146 of interest. In this example, an item detection model detects items, such as individual items and/or pallets and item tags. An item tag is a tag on an individual item and/or a tag on a pallet. The tag includes information such as a pallet ID, an item ID, and/or a date the tag was created. The tag may include other information, such as barcodes, shipping information, etc.

The object detection model(s) 144 also includes a vertical member detection model trained to detect a vertical member on an item storage structure, such as a vertical steel bar and/or a door on a display. The object detection model(s) 144 in this example are convolutional neural network (CNN) models which identify objects in images by enclosing the identified objects in a bounding box. Thus, the vertical member detection model encloses each detected vertical member in a vertical member bounding box. The item detection model encloses each item/pallet in a bounding box. Each item tag, including pallet tags, are also enclosed in a bounding box by the item detection model.

The filter manager 140 in this example is located on the computing device 102. However, the embodiments are not limited to implementing the filter manager on a computing device. In other examples, the filter manager 140 is hosted on a cloud server, as shown in FIG. 2 below.

The system 100 uses an IRAS computer vision platform to detect vertical steel bars associated with bins, detect doors associated with item displays, and filter adjacent bins and adjacent doors for item/pallet selection. The system analyzes input images and filters out adjacent bin pallet tag detections from the reserve area payload inference results. The system identifies vertical steel bars between bins and/or display case doors. It determines whether an item or pallet in an image belongs to the target compartment or an adjacent compartments. The system filters/removes items located in the adjacent compartments to reduce false positives by seventy percent.

This innovative system offers the unique ability to accurately differentiate whether a pallet in any payload image belongs to the target bin or the adjacent bin. It utilizes a robust steel bar detection model that effectively identifies steel bars in challenging conditions, regardless of image angle or lighting. The system estimates the shelf layout based on original images containing only partial view of the display case doors and/or bins, instead of using any image stitching algorithm. The adjacent compartment (door/bin) item/pallet filtering logic combines multiple signals on original images such as vertical steel bar detections, image timestamp and steel bar tracking to identify the same vertical steel bar across different images and then identifies adjacent bin pallets based on the relative position of pallets to vertical steel bars in those images. This cutting-edge feature enhances warehouse management and efficiency by providing precise information on bin occupancy and pallet positioning. This information is used for inventory updates, identifying the location of pallets and individual items within a store, generate or update a planogram, etc.

FIG. 2 is an exemplary block diagram illustrating a retail environment 200 including image capture device(s) 202 for capturing images used to filter adjacent items from object detection results. The retail environment 200 is an environment including a retail facility, such as, but not limited to, a store, a warehouse, and/or a distribution center. A store is any type of facility having retail items for purchase or lease. The store includes indoor facilities, outdoor facilities and facilities which include both fully enclosed areas, unenclosed areas and/or partially encloses areas, such as garden centers.

The image capture device(s) 202 includes one or more image capture devices for generating image(s) 206, such as, but not limited to, the image capture device 116 in FIG. 1. The image capture device(s) 202 in this example are mounted on one or more robotic devices or integrated into one or more robotic devices, such as, but not limited to, the robotic device(s) 204. The robotic device(s) 204 transmits the image(s) 206 to a cloud server 118 for analysis by a filter manager 140 via a network, such as, but not limited to, the network 112 in FIG. 1.

The filter manager 140 analyzes the images using object detection models to identify a plurality of item(s) 208 associated with one or more compartments) 210 of an item storage structure 212. The filter manager 140 filters the identified item(s) 208 on the item storage structure 212 and maps the remaining filtered items to a mapping table 126 stored on a database 220.

The item storage structure 212 is an item display and/or storage structure, such as, but not limited to, a set of display cases, shelving, bins, or any other type of item storage structure. The item storage structure 212 is subdivided into the compartment(s) 210. The item(s) 208 are displayed and/or stored on one or more compartments, inside one or more compartments, etc.

The item storage structure 212 includes one or more vertical member(s) 214. The vertical member(s) 214 defines the compartment(s) 210. The vertical member(s), in some embodiments, include one or more vertical steel bar(s) 218 separating each compartment. In other words, a pair of vertical steel bars and/or a horizontal steel bar defines the boundaries of one compartment. The items in the compartment sit on a horizontal platform between the pair of steel bars, sit underneath the horizontal platform between the pair of steel bars, etc.

Figure 5:
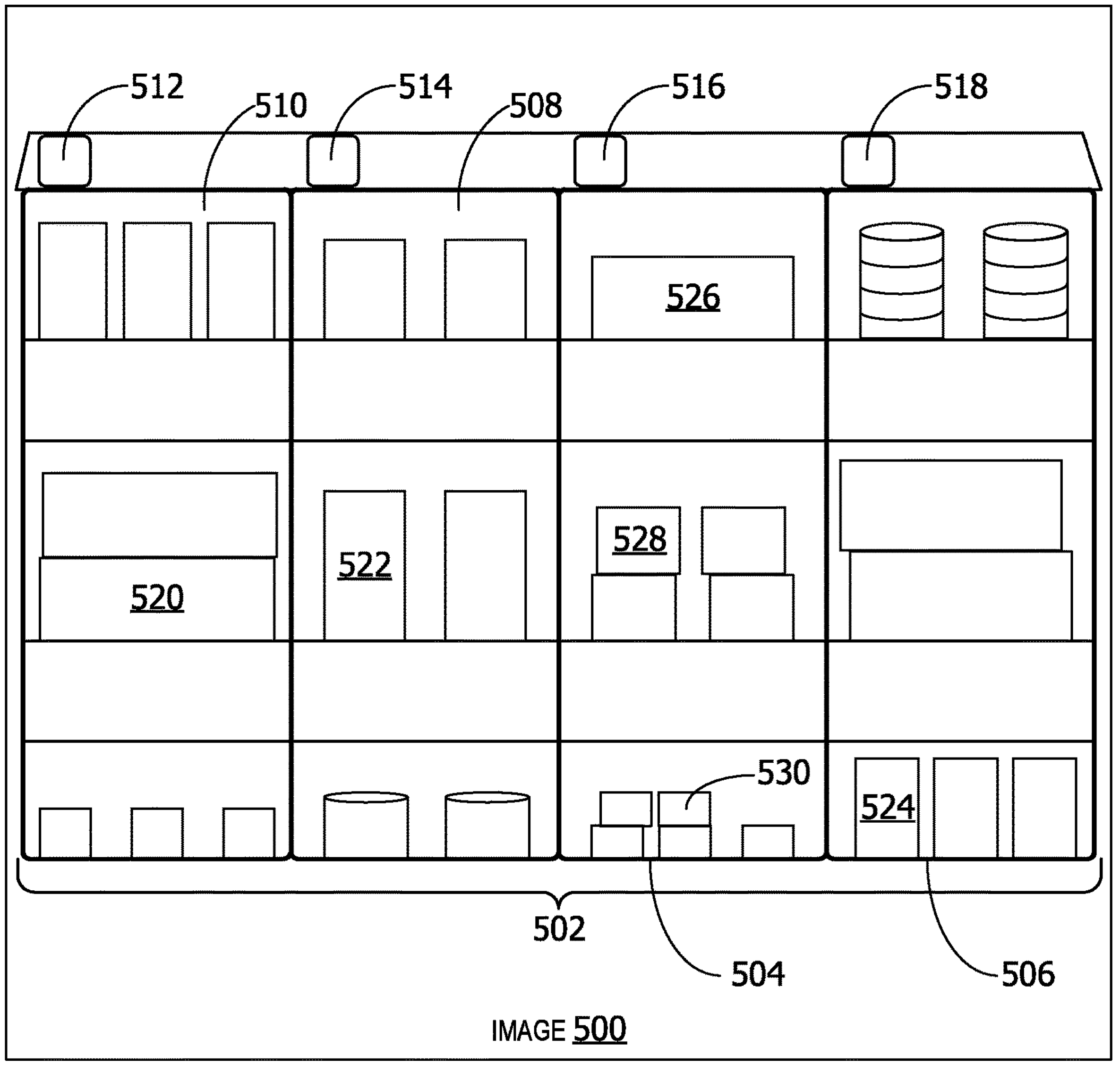
FIG. 5 is an exemplary block diagram illustrating a plurality of display cases having a plurality of display doors.

In other embodiments, the vertical member(s) 214 includes display door(s) 216. A display door is a door on a display case. A display case is any type of display case having an interior compartment with shelving inside for storing and/or displaying items, such as, but not limited to, temperature-controlled display case and/or non-temperature controlled display cases. A temperature-controlled display case is any type of display case having a temperature-controlled interior, such as, but not limited to, a freezer display case, a refrigerated display case, a warm/heated display case for keeping rotisserie items warm, etc. Each display case has its own display door. Each display case is associated with a location tag, as shown in FIG. 5 below.

Figure 3:
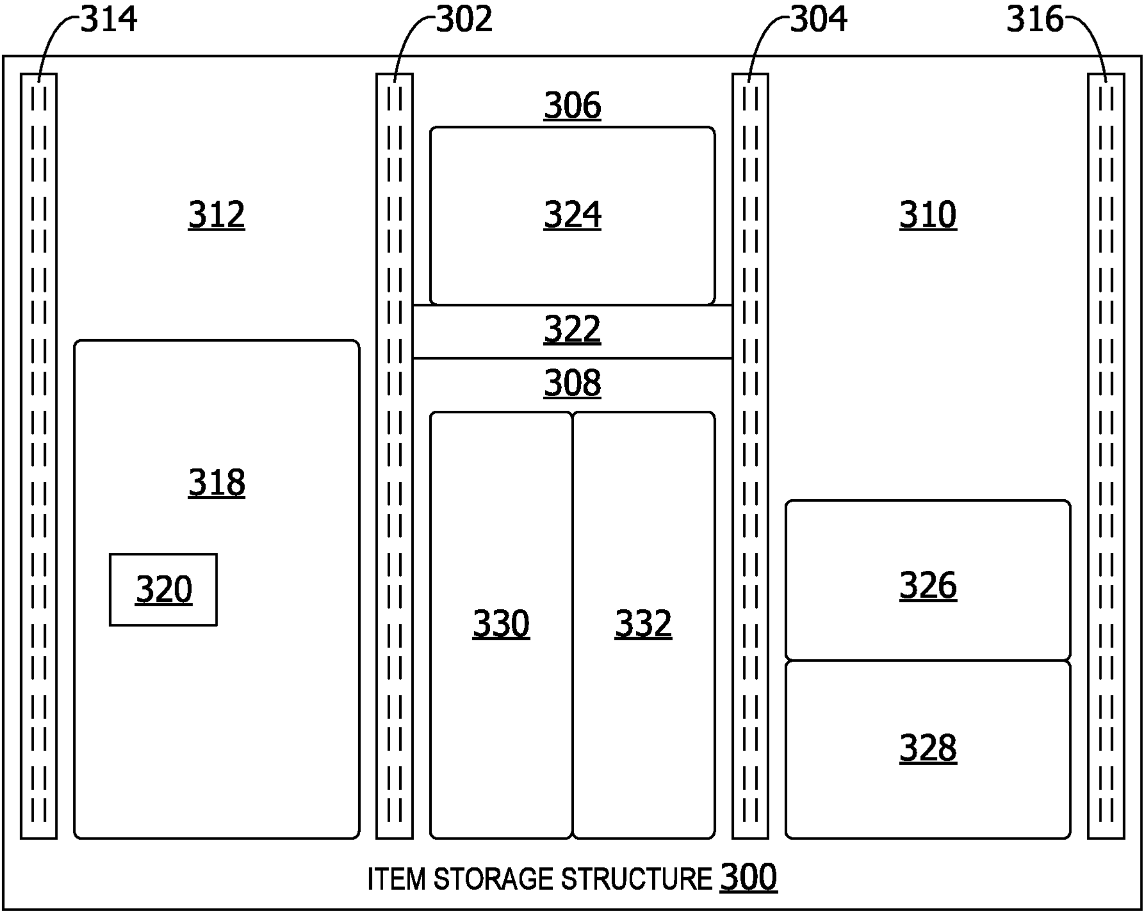
FIG. 3 is an exemplary block diagram illustrating an item storage structure including pallets, pallet tags and vertical steel bars.

Referring now to FIG. 3, an exemplary block diagram illustrating an item storage structure 300 including pallets, pallet tags and vertical steel bars is shown. The item storage structure is a structure for storing and/or displaying items, such as, but not limited to, the item storage structure 212 in FIG. 2. The items stored on the item storage structure in this example includes a plurality of pallets, such as, the pallet 318. Each pallet is associated with a pallet tag, such as, but not limited to, the pallet tag 320 on the pallet 318. The pallet tag includes information such as, but not limited to, a pallet ID, an item ID associated with individual items in the pallet, and/or a date the pallet tag was created.

The vertical members, in this example, are vertical steel bars. A pair of vertical steel bars define each compartment. The vertical steel bars separate out compartments (bins) in a reserve item storage area, thus detection of these bars assists in filtering out adjacent compartment pallets. The reserve area images, in this example, are grayscale and are captured at a slanted angle. Also, the images are captured from different angles and have varying lighting conditions. This causes the shape and color of the vertical steel bar to vary from image to image. Thus, the system utilizes an object detection model that is agnostic of the above variations and can capture the basic structure of vertical steel bars from reserve area images. The model is light weight to ensure low inference time.

In this example, a start type vertical steel bar 302 and an end type vertical steel bar 304 define a target compartment 306. The target compartment 306 is separated from another compartment 308 by a horizontal steel bar 322. The unused vertical steel bars 314 and 316 are not associated with the selected target compartment in this example. The adjacent compartments in this example include adjacent compartment 312 defined by vertical steel bar 314 and vertical steel bar 302, adjacent compartment 310 defined by the vertical steel bar 304 and the vertical steel bar 316, and the adjacent compartment 308 located below the horizontal steel bar 322.

In this example, the compartment 308 is an adjacent compartment. In other embodiments, the compartment 308 is considered part of the target compartment defined by the start type vertical steel bar 302 and the end type vertical steel bar 304.

The pallet 324 is the only item located in the target compartment 306. The pallet 318 is an adjacent item located in the adjacent compartment to the left of the start type vertical steel bar (vertical member). The pallet 326 and the pallet 328 are adjacent items located to the right of the end type vertical steel bar in this example. And the pallet 330 and pallet 332 are adjacent items located beneath the horizontal steel bar 322.

In some embodiments, a filter manager analyzes a series of images of the item storage structure 300 and identifies a plurality of items, including the pallet 318, the pallet 324, the pallet 330, the pallet 332, the pallet 326 and the pallet 328. The filter manager assigns the start type to the vertical steel bar 302 and an end type to the vertical steel bar 304. The other vertical steel bars are assigned the unused type. The filter manager tracks the vertical steel bars 302 and 304 in every image in the image sequence of the item storage structure 300. The filter manager removes (filters) the pallet 318 located to the left side of the start type vertical steel bar. The filter manager removes the pallet 326 and the pallet 328 located to the right of the end type vertical steel bar. The filter manager, in some embodiments also filters the pallet 330 and 332 located beneath the horizontal steel bar 322. The filter manager maps the pallet 324 to a location of the compartment 306 in the item-to-location map in a mapping table, such as, but not limited to, the mapping table 126 in FIG. 1 and FIG. 2.

In other examples, the pallet 330 and the pallet 332 are not filtered but are included as items in the compartment 306. In this example, the pallets 332 and 330 are mapped to the same location as the pallet 324.

In this example, the item storage structure includes four compartments storing six pallets. However, the embodiments are not limited to an item storage structure having four compartments and six pallets. In other examples, an item storage structure includes any number of compartments storing any number of pallets or other individual items.

In this example, the target compartment is located in the center of the item storage structure. However, in other embodiments, the target compartment is located on the left side of the item storage structure or the right side of the item storage structure. Likewise, in this example, the target compartment is located above another compartment. In other examples, the target compartment is located beneath another compartment, such as compartment 308. In still other examples, the target compartment is not divided by a horizontal bar, such as, but not limited to, the compartment 312 or the compartment 310.

Figure 4:
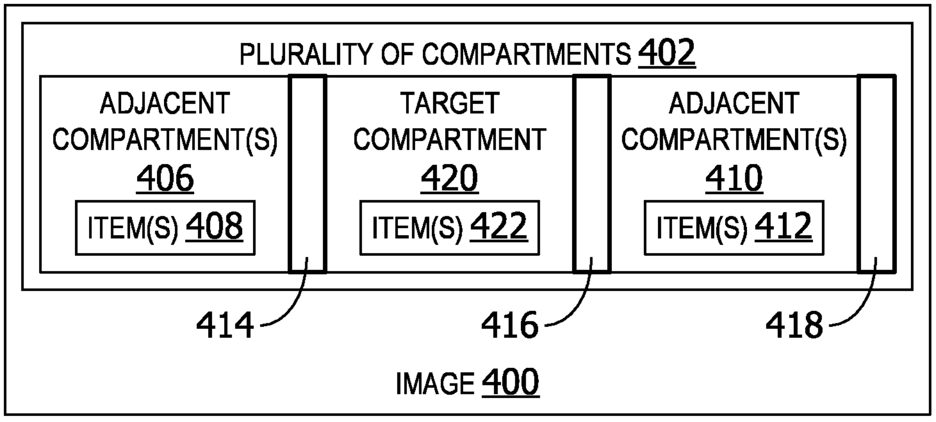
FIG. 4 is an exemplary block diagram illustrating an image including storage compartments, vertical members, and a plurality of items.

FIG. 4 is an exemplary block diagram illustrating an image 400 including storage compartments, vertical members, and a plurality of items. In this example, the image includes a plurality of compartments 402, such as, but not limited to, the compartment(s) 210 in FIG. 2 and/or the compartments 312, 306, 308, and/or 310 in FIG. 3.

The plurality of compartments 402 includes a target compartment 420 storing a set of one or more target item(s) 422. The target compartment 420 is flanked by one or more adjacent compartment(s) 406 storing a first set of one or more adjacent item(s) 408 on the left side of a start type vertical steel bar 414. The target compartment 420 is also flanked by one or more adjacent compartment(s) 410 storing a second set of one or more adjacent item(s) 412 on a right side of an end type vertical steel bar 416. The vertical steel bar 418 is an unused type of vertical member which is disregarded by the filter manager analyzing the image 400.

In this example, the target compartment 420 is flanked by adjacent compartments on both sides. However, in other examples, the target compartment 420 only includes adjacent compartments on a single side of the target compartment, such as only on the right side of the start type vertical steel bar 414 or only on the left side of the end type vertical steel bar 416.

In this example, the target compartment is shown in a single image 400. However, in other examples, the filter manager receives multiple images of the plurality of storage compartments including the target compartment and one or more adjacent compartments.

Turning now to FIG. 5, an exemplary block diagram illustrating a plurality of display cases having a plurality of display doors is shown. In this example, an image 500 of an item storage structure includes a plurality of display doors 502. The plurality of display doors 502 includes a target display door 504, a first adjacent display door 506, a second adjacent display door 508 and a third adjacent display door 510. An adjacent display door includes doors that are immediately adjacent to the target door, such as the display doors 506 and 508. An adjacent display door also includes doors visible within the image that are not immediately adjacent to the target door, such as, but not limited to, the adjacent display door 510 which is two doors away from the target display door 504.

The filter manager tracks the target display door in every image of the item storage structure including the plurality of display doors created within a predetermined time period. Thus, the target object is only tracked in images captured in sequence during a single image capture event. The system does not track an object through images captured over extended periods of time, such as hours, days, or weeks.

The system filters items visible within the adjacent display cases associated with the adjacent display doors, such as, the adjacent item 520 associated with the adjacent display door 510, the adjacent item 522 associated with the adjacent display door 508 and/or the adjacent item 524 associated with the adjacent display door 506. The target items identified within the display case (target compartment) associated with the target display door 504 are mapped to the location of the target display case associated with the target display door 504. In this example, some of the target items in the target display case include target item 526, target item 528 and target item 530.

The location of each display case is identified using location tags associated with each display case. In this example, a location tag 512 includes location information identifying a location of the display case associated with the display door 510. The display door 508 is associated with a location of the display case having the location tag 514. The location of the target display case associated with the target display door 504 is provided by the location tag 516. The location of the adjacent display case associated with the display door 506 is obtained from the location tag 518.

In some embodiments, a tag detection model identifies the location tags in each image, such as, but not limited to, the location tags 512, 514, 516 and 518 in the image 500. An optical character recognition component analyzes alphanumeric text on each tag to obtain location data. The location data can include a location ID or other location information. For example, one display door is identified with a location ID FF2, and the next door is associated with a location ID FF3. The filter manager uses the location data to map the identified items in the target compartment to the location of the target compartment.

The location tags in this example are associated with display case doors. In other examples, the location tags are associated with bins or other compartments on an item storage structure, such as, the compartment(s) 210 in FIG. 2, the compartments 306, 308, 310 and 312 in FIG. 3, and/or the compartments 406, 420 and 410 in FIG. 4.

In the example of FIG. 5, location tags are placed at the top left corner of every display case, which can lead to adjacent bin issues due to close placements of the doors and tags. Each image covers multiple doors and locations. Items can be spread across multiple display cases. It can be very challenging to accurately assign the right location to items in the display cases. The door detection solves this problem by identifying target doors and filtering adjacent items from the item detection results. This reduces false positives and helps in improving item-to-location mapping accuracy.

Figure 6:
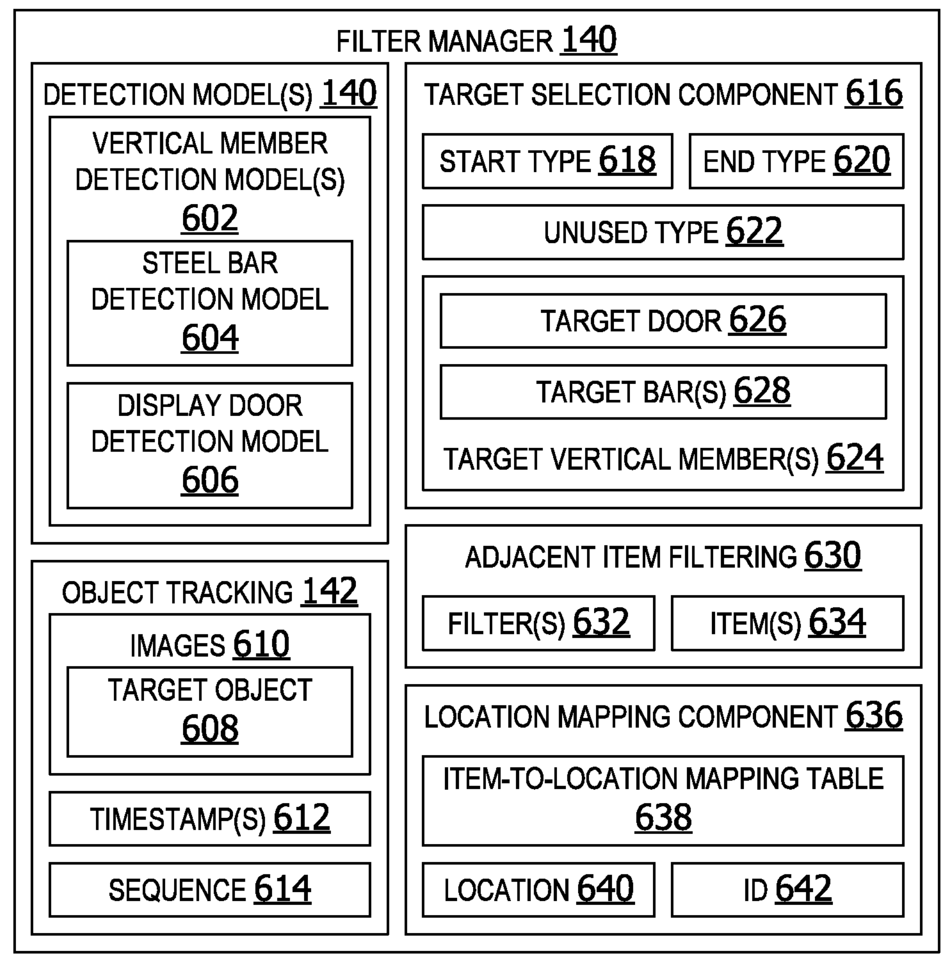
FIG. 6 is an exemplary block diagram illustrating a filter manager.

FIG. 6 is an exemplary block diagram illustrating a filter manager 140. The filter manager 140 includes one or more detection model(s) 144 for detecting objects of interest in one or more images. The detection model(s) 144 are trained deep learning, CNN models. The detection model(s) 144 in this example includes one or more vertical member detection model(s) 602. A steel bar detection model 604 is a trained deep learning model for detecting vertical steel bars in images, such as, but not limited to, the vertical steel bar(s) 218 in FIG. 2, the vertical steel bars 302, 304, 314 and 316 in FIG. 3, and/or the vertical steel bars 414, 416 and 418 in FIG. 4. The display door detection model 606 is a deep learning object detection model trained to detect and recognize display case doors, such as, but not limited to, the display door(s) 216 in FIG. 2 and/or the display doors 504, 506, 508 and 510.

The object tracking 142 is a software component that tracks a target object 608 in a plurality of images 610 using timestamp(s) 612 associated with each image captured in a sequence 614 by an image capture device. The target object 608 is one or more objects of interest, such as a start type vertical steel bar, an end type vertical steel bar, and/or a target display door. The timestamp(s) 612 are used to determine an order or time sequence in which each image was captured by the image capture device. This assists the filter manager in accurately tracking the same object through multiple different images captured by an image capture device that is in motion as the images are taken.

The target selection component 616 is a software component that applies a set of rules to identify one or more target vertical member(s) 624 in one or more images. The target vertical member(s) 624 includes a target door 626 and/or one or more target bar(s) 628. A target bar can include a start type 618 vertical steel bar and/or an end type 620 vertical steel bar. Vertical steel bars which are not being tracked are labeled as unused type 622 bars.

In one example, the target selection component 616 applies a rule to determine which display door to track and/or target. An example rule specifies that the display case door which is located farthest to the right in the first image of a sequence of images should be selected as the target. In each subsequent image in the sequence, the target door is shown in a position which is moving progressively closer to the left side of the images because the robotic device generating the images is in motion when the sequence of images is created. In another example, a rule optionally specifies that the target door selected should be visible in its entirety in a given image. Doors which are only partially visible at the edges of the image (partially out of frame) should not be selected as the target door. However, the examples are not limited to this rule. In other embodiments, different user-configurable rules are applied to select a target door or target vertical steel bar in one or more images.

The filter manager 140 includes an adjacent item filtering 630 software component applies one or more adjacent item filter(s) 632 to a plurality of identified items on an item storage structure to filter adjacent item(s). The remaining target item(s) 634 in the plurality of identified items are mapped to an item-to-location mapping table 638 by a location mapping component 636. The location mapping component 636 maps each of the target item(s) 634 to a location 640 associated with a location ID 642 of the target compartment. In an example, the universal product code (UPC) for each target item in a target compartment is mapped to a location ID for the target compartment in the item-to-location mapping table.

The item-to-location mapping table is stored in a database, such as, but not limited to, the database 220 in FIG. 2. The database is stored on a data storage device, such as, but not limited to, the data storage device 124 in FIG. 1. In other embodiments, the database is located on a cloud server, such as, but not limited to, the cloud server 118 in FIG. 1.

FIG. 7 is an exemplary block diagram illustrating mapping data 700 associated with mapping items to compartments on an item storage structure. The mapping data 700 includes a bin ID and a pallet ID associated with each pallet identified in each bin. A bin is a type of compartment on an item storage structure. A pallet is a type of item stored in a bin on an item storage structure.

In this example, the mapping data includes data mapping pallet IDs to six different bins on a pallet storage structure. However, the embodiments are not limited to mapping pallets to six bins. In other examples, the mapping data includes one or more pallet IDs mapped to one or more bins. For example, the mapping data 700 can include dozens, hundreds or even thousands of pallet IDs mapped to dozens, hundreds or even thousands of bins.

Figure 8:
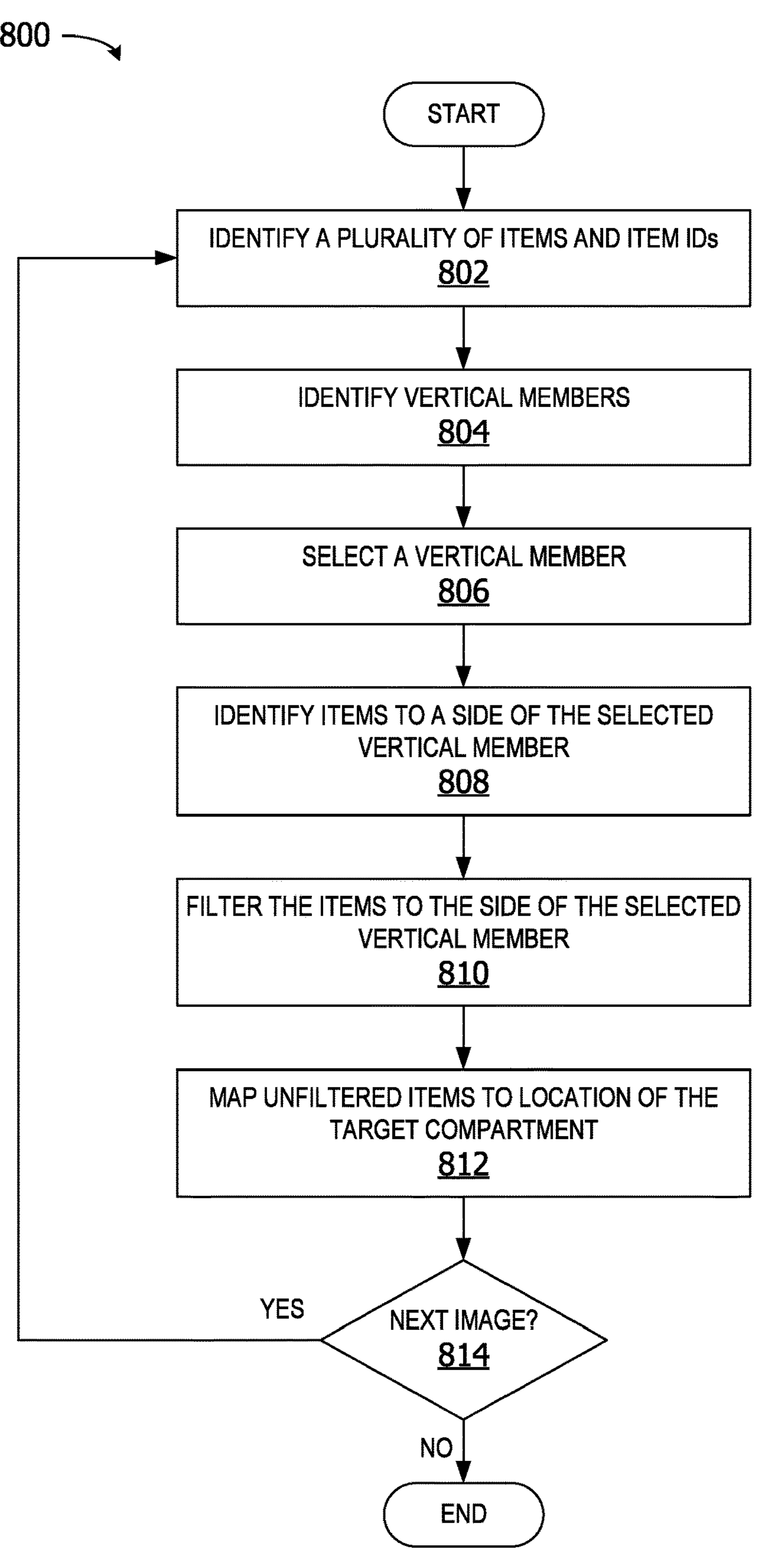
FIG. 8 is an exemplary flow chart illustrating operation of the computing device to filter items for more accurate item-to-location mapping.

FIG. 8 is an exemplary flow chart illustrating operation of the computing device to filter items for more accurate item-to-location mapping. The process 800 shown in FIG. 8 is performed by a filter manager component, executing on a computing device, such as the computing device 102 in FIG. 1.

The process begins by identifying a plurality of items and item IDs at 802. The item IDs are obtained using OCR to read item IDs on detected item tags, such as, but not limited to, pallet tags on pallets. The filter manager identifies one or more vertical members on an item storage structure at 804. The filter manager selects a vertical member at 806. The selected vertical member is a start type vertical steel bar, an end type vertical steel bar or a target display door. The filter manager identifies items to a selected side of the selected (target) vertical member at 808. The selected side is a right side of the vertical member or a right side of the vertical member. The filter manager filters items to the selected side of the selected vertical member at 810. The filter manager maps the unfiltered items to a location of the target compartment at 812. A determination is made whether a next image is obtained from the image capture device for analysis at 814. If yes, the process iteratively performs operations 802 through 814 until there are no additional images obtained. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
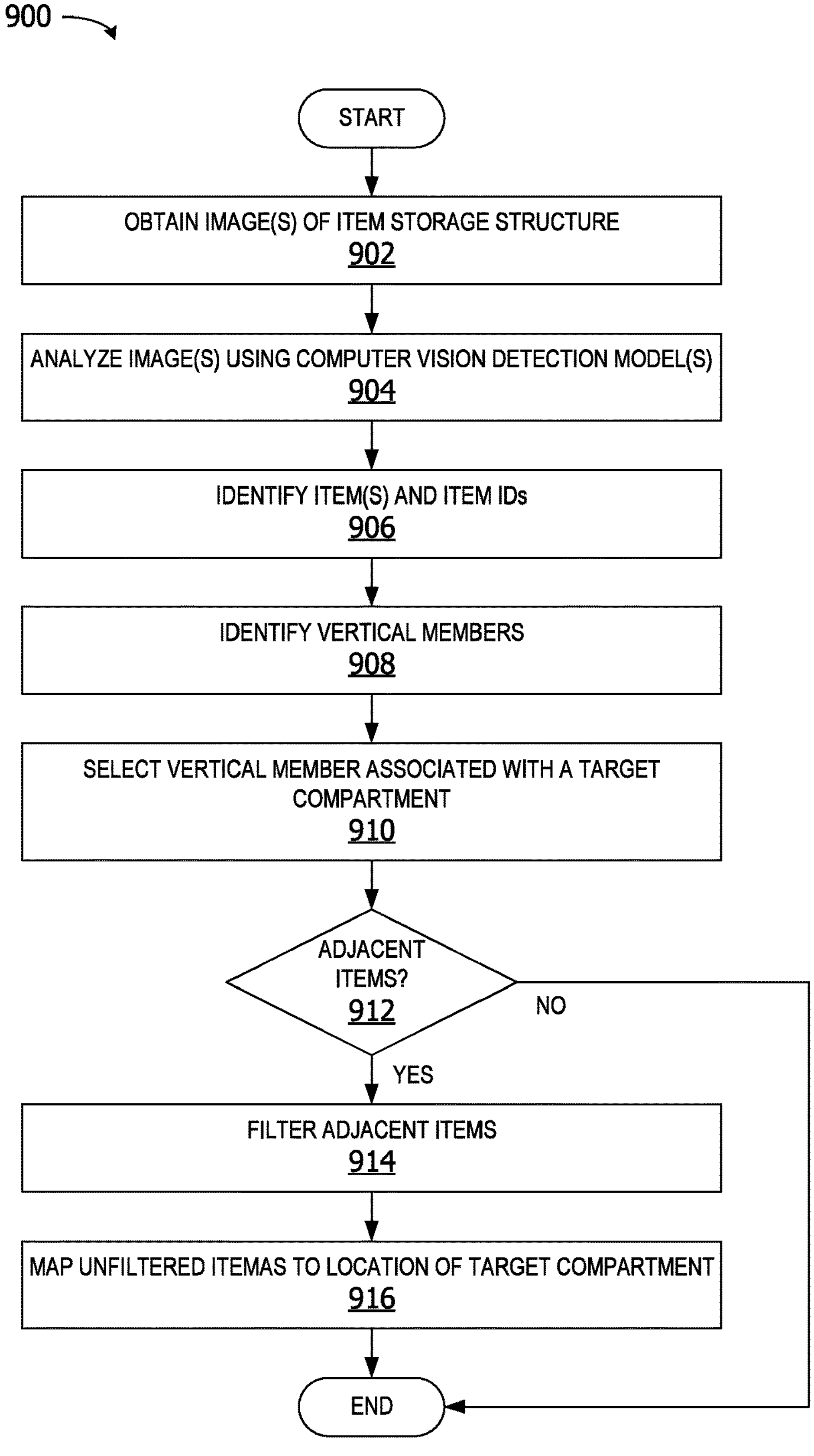
FIG. 9 is an exemplary flow chart illustrating operation of the computing device to filter adjacent items associated with vertical members of a target compartment.

FIG. 9 is an exemplary flow chart illustrating operation of the computing device to filter adjacent items associated with vertical members of a target compartment. The process 900 shown in FIG. 9 is performed by a filter manager component, executing on a computing device, such as the computing device 102 in FIG. 1.

The process begins by obtaining image(s) of an item storage structure at 902. The images are generated by an image capture device, such as, but not limited to, the image capture device 116 in FIG. 1. The filter manager analyzes the image(s) using computer vision detection model(s) at 904. The detection model(s) include one or more deep learning object detection models, such as, but not limited to, the detection model(s) 144 in FIG. 1. The filter manager identifies item(s) and item IDs at 906. The filter manager identifies one or more vertical members in the image(s) at 908. The filter manager selects a vertical member associated with a target compartment at 910. The target compartment is a compartment, such as a bin or display case. A determination is made whether any adjacent items are identified at 912. An adjacent item is an item associated with an adjacent compartment. If yes, the adjacent items are filtered at 914. The filter manager maps unfiltered items to a location of the target compartment at 916. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
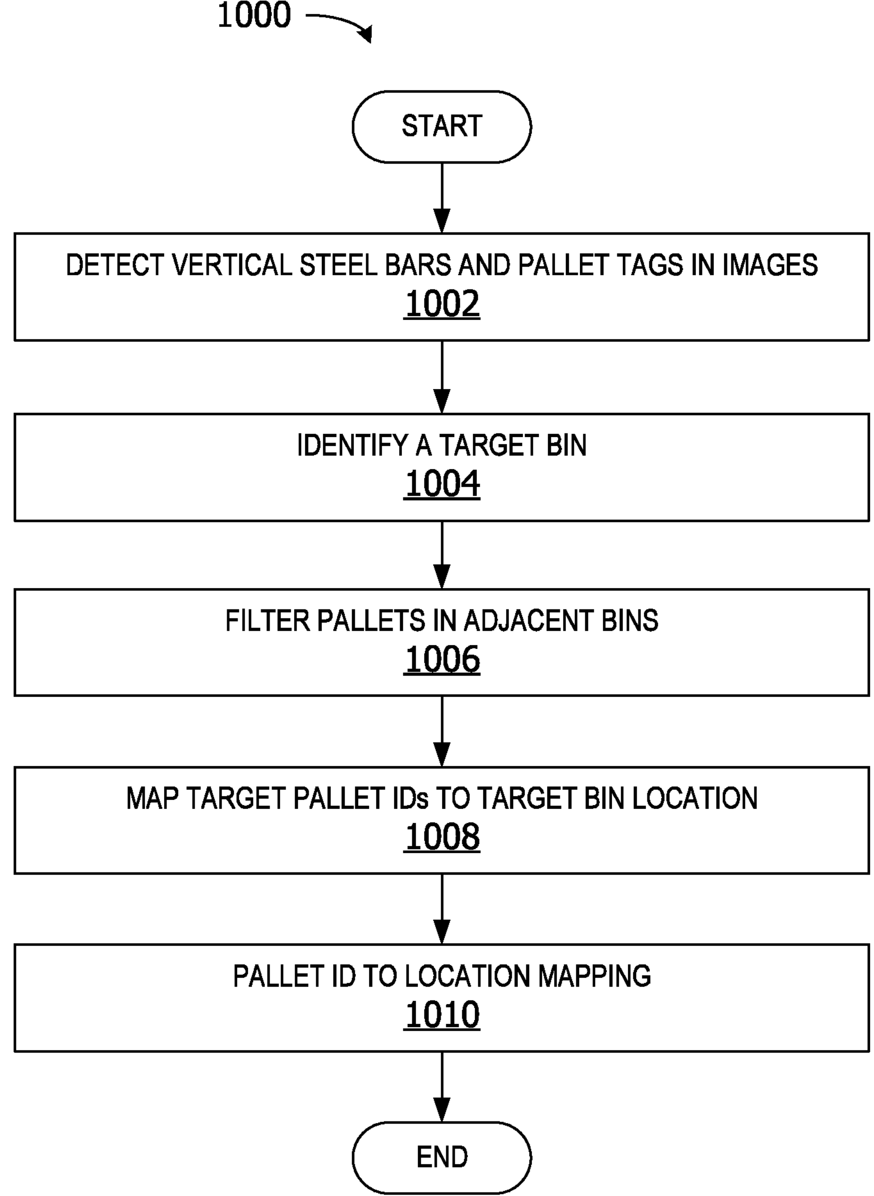
FIG. 10 is an exemplary flow chart illustrating operation of the computing device to map target pallet identifiers to a location of a target bin using adjacent item filtering.

FIG. 10 is an exemplary flow chart illustrating operation of the computing device to map target pallet identifiers to a location of a target bin using adjacent item filtering. The process 1000 shown in FIG. 10 is performed by a filter manager component, executing on a computing device, such as the computing device 102 in FIG. 1.

The process begins by detecting vertical steel bars and pallet tags in images at 1002. The filter manager identifies a target bin at 1004. The filter manager filters adjacent pallets in adjacent bins at 1006. The filter manager maps target pallet IDs to the target bin location at 1008. The filter manager performs pallet ID to location mapping at 1010. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
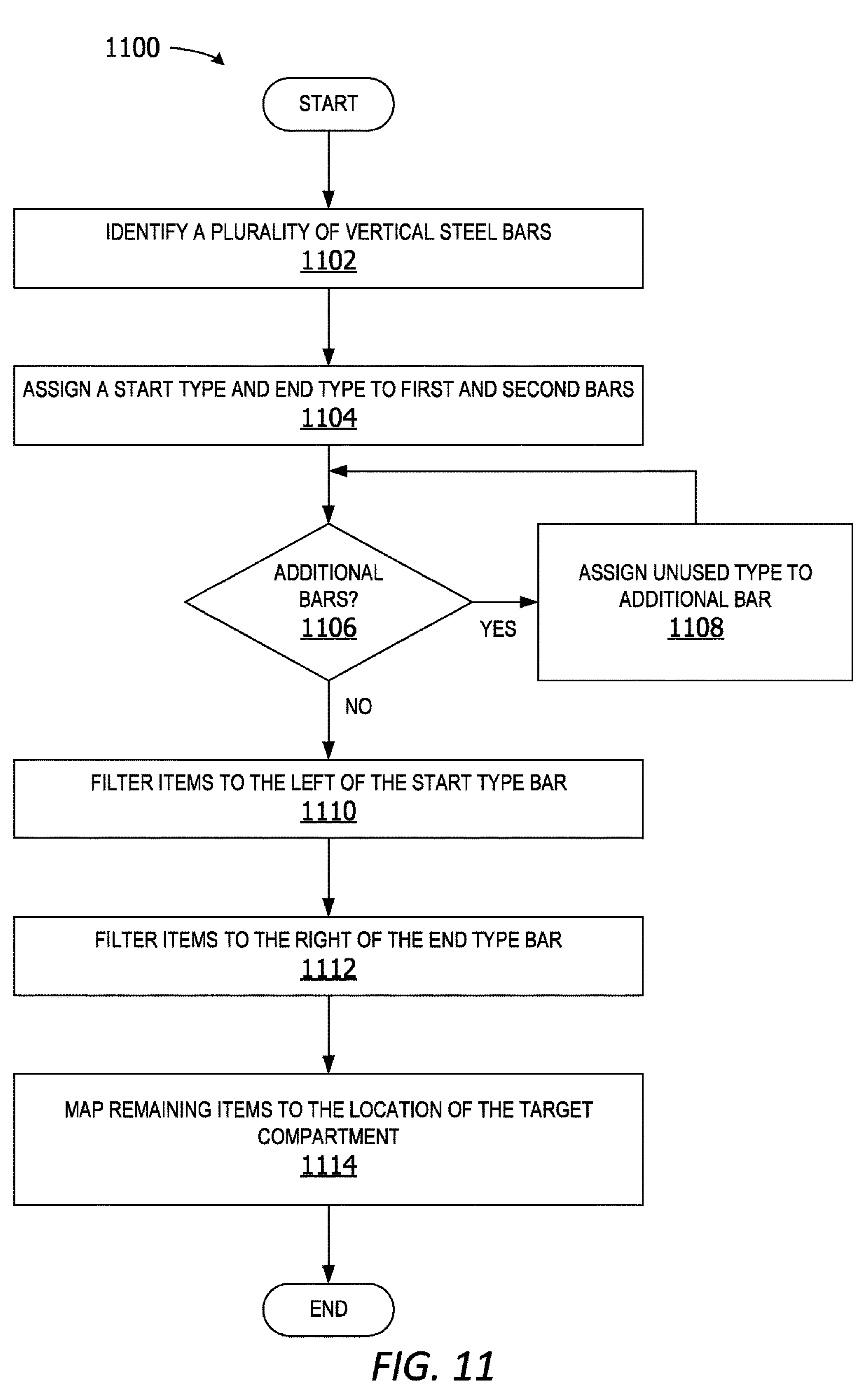
FIG. 11 is an exemplary flow chart illustrating operation of the computing device to filter items based on start type and end type vertical bars.

FIG. 11 is an exemplary flow chart illustrating operation of the computing device to filter items based on start type and end type vertical bars. The process 1100 shown in FIG. 11 is performed by a filter manager component, executing on a computing device, such as the computing device 102 in FIG. 1.

The process begins by identifying a plurality of vertical steel bars at 1102. The filter manager assigns a start type and an end type to a first vertical bar and a second vertical bar associated with a target compartment at 1104. A determination is made whether any additional vertical bars are detected at 1106. If yes, an unused type is assigned to the additional bars at 1108. The filter manager filters items to the left of the start type vertical bar at 1110. The filter manager filters items to the right of the end type vertical bar at 1112. The filter manager maps the remaining items to the location of the target compartment at 1114. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
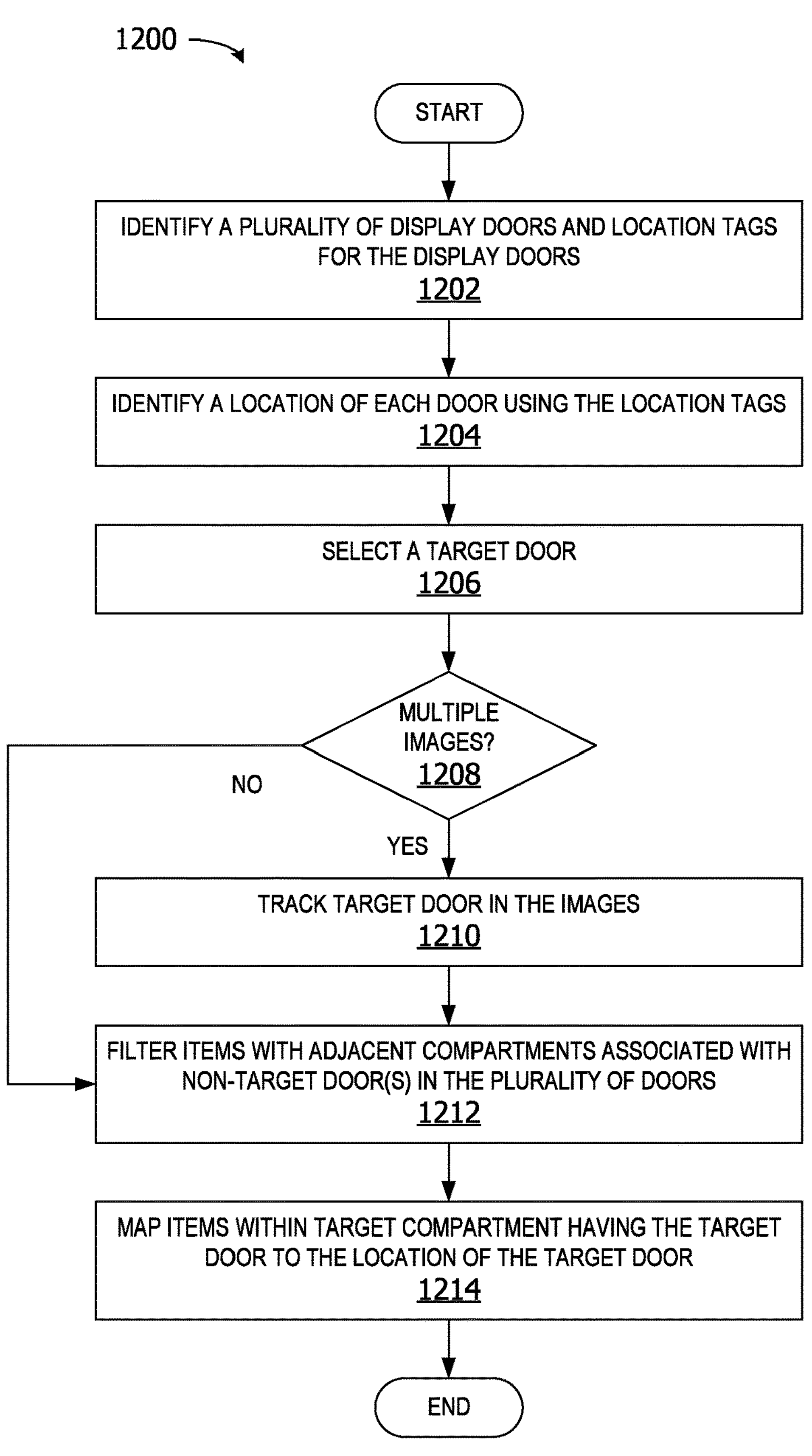
FIG. 12 is an exemplary flow chart illustrating operation of the computing device to track a display case door and filter items associated with adjacent compartment doors.

FIG. 12 is an exemplary flow chart illustrating operation of the computing device to track a display case door and filter items associated with adjacent compartment doors. The process 1200 shown in FIG. 12 is performed by a filter manager component, executing on a computing device, such as the computing device 102 in FIG. 1.

The process begins by identifying a plurality of display doors and location tags for the display doors at 1202. The filter manager identifies a location of each door using the location tags at 1204. The filter manager selects a target door at 1206. A determination is made whether multiple images are obtained at 1208. If yes, the target door is tracked in the multiple images at 1210. The filter manager filters items with adjacent compartments associated with non-target doors in the plurality of doors at 1212. The filter manager maps the items within the target compartment having the target door to the location of the target door at 1214. The process terminates thereafter.

While the operations illustrated in FIG. 12 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 12.

ADDITIONAL EXAMPLES

In some embodiments, the system differentiates whether a pallet and/or an item in one or more images belongs to a target bin or an adjacent bin in the one or more images. Adjacent bin filtering logic combines vertical steel bar detections using timestamps for images and steel bar tracking across multiple images in a series to identify the same vertical steel bar(s) in each image in the series of images. Pallet filtering logic identifies adjacent bin pallets based on the relative position of each pallet to a selected vertical steel bar in the images. The system filters adjacent bin pallet tag detections to reduce false positives.

In some embodiments, the system includes a trained deep learning model which detects vertical steel bars in images for use in identifying which bin a pallet/pallet tag is located and/or to identify freezer doors more accurately for use in determining the location of items within the freezer sections where multiple freezer doors appear in images.

In one example, a filter manager identifies a plurality of vertical bin members within a plurality of bin images generated by a robotic imaging device. The filter manager labels a first vertical bin member and a second vertical bin member associated with a target bin in the plurality of bin images using a vertical member object detection model. The filter manager performs adjacent bin filtering to remove adjacent items from the item detection results. The adjacent bin filtering removes item detections associated with at least one adjacent bin corresponding to items located to a right side of the second vertical bin member and items located to a left side of the first vertical bin member in the plurality of images. The filter manager identifies an identification tag associated with each target item associated with the target bin. A target item is an item located to a right side of the first vertical bin member and to a left side of the second vertical bin member.

In other embodiments, the system provides customized vertical object detection for improved compartment contents identification. The filter manager provides pallet selection logic for detection of steel bars and display case doors associated with item storage compartments in images. The images of storage compartments contain views of adjacent storage compartments, such as adjacent bins and/or adjacent display case doors. The image contains a target compartment, such as a bin or display case (freezer or refrigerated display case door). Only the pallet ID or item ID of items contained in the target compartment should be added to the target compartment location.

In an example scenario, an image capture device generates images of an area in a store, warehouse, or distribution center, including an item storage structure or a portion of an item storage structure. The image capture device can be implemented as an image capture device on a robotic (mobile) device or mounted at a static/stationary location. The images capture device(s) capture images of pallet bins and/or display cases, such as, but not limited to, freezer displays, refrigerator displays, heated/warm food item display cases, premium item display cases, locking security display cases, etc. In some examples, the image capture devices capture images of pallets in a reserve payload area. In other examples, the image capture devices capture images of items in a freezer display or a refrigerator display case having transparent doors, such as glass doors. The images usually contain images with adjacent bin view or adjacent doors visible within the image of the target bin/target door. But the image of a payload is expected to focus on only one target bin/display case and only the pallet ID or item ID from the target bin or display should be added to the target bin location or the target display case location.

In other embodiments, the system detects items, pallets, and tags in images. It determines which items, pallets and tags are located in a target compartment. Items in the adjacent compartments are filtered/disregarded for more accurate results mapping items to locations in the store and improves pallet location accuracy. The system automatically filters out the adjacent bin pallet tag detections from the reserve area payload inference results. The system includes a deep learning detection model based automated system that uses vertical steel bar detections to identify target bins and remove adjacent bin pallet tag detections. The detection model is an object detection model trained using customized training data labelled (for vertical steel bars) reserve area images. In some examples, the final trained model is very accurate and can detect vertical steel bars and display case doors in very challenging situations.

The detection model is trained to identify vertical steel bars and doors in images. The model orders payload image sequence by timestamp and tracks vertical steel bar based on detection results in the image sequence. The system identifies the same vertical steel bar across different images. The model determines the start and end of each bin using steel bar tracking to determine the boundary of each bin for the payload and track the vertical steel bars in each image. Each detected steel bar in an image or series of payload images is assigned to a type "start" or "end" or "not used to filter adjacent bin tag." In each image, filter tags located on the left of steel bar detection with type "start" and tags located on the right of steel bar detection with type "end" as adjacent bin tags.

In an example, the system filters adjacent item tags from images using a detection model that identifies a plurality of vertical storage device members within a plurality of images generated by a robotic imaging device. The detection model labels a first vertical member and a second vertical member associated with a target compartment in the plurality of images by a trained deep learning model. The detection model performs adjacent compartment filtering of the images, where adjacent compartment filtering removes item detections associated with at least one adjacent compartment corresponding to items located to a right side of the second vertical member and items located to a left side of the first vertical member in the plurality of images. The detection model identifies an identification tag associated with each target item associated with the target bin. A target item is an item located to a right side of the first vertical bin member and to a left side of the second vertical member. In this manner, the system accurately determines if a pallet belongs to a target bin or adjacent bin and identify steel bars in challenging situations regardless of the angle of the input image, gray scale, lighting conditions, etc. The system determines whether a pallet belongs to a bin based on relative location of each pallet to the steel bars.

In another example scenario, freezer door selection logic is used to detect the correct location of items in a freezer section of a store. An object detection model is trained using labeled training data to detect freezer doors and location tags with a high degree of accuracy, even in challenging situations, such as where freezer doors may be different colors, only a portion of a door may be visible in an image, the image includes poor lighting and/or the image was generated with a poor/challenging camera angle. The system performs freezer door tracking to track a target freezer door across multiple images based on relative freezer door position using a set of rules, including image capture rules for the robotic device and/or calibration rules for calibrating the image capture device. In this example, the rules specify that the right most freezer door in an image is selected as the target door.

In one example, the detection model(s) include a trained you only live once (YOLO) version five object detection model trained to detect vertical steel bars and/or display case doors. The training data includes images of vertical steel bars and display case doors with bounding boxes placed around the vertical steel bars and the freezer doors. The images include gray scale images hand labeled by human users in this example.

The system, in another examples, obtains images with vertical steel bars detected by the model. The system performs pallet tag detection and vertical steel bar detection. The system identifies a target bin and filters pallets located in adjacent bins. The system maps the target pallet IDs to the location ID for the target bin location in a mapping table. The system provides a pallet area vertical steel bar detection model and a pallet selection logic for the detection of steel bars for pallet tag images. The system differentiates whether a pallet in the payload image belongs to the bin that is the focus of the image or an adjacent bin and estimates shelf layout based on images containing partial views of bins.

In other embodiments, the system comprises an adjacent bin pallet filtering logic that combines multiple signals such as vertical steel bar detections, image timestamp, and/or steel bar tracking on original images to identify the same vertical steel bar across different images. The pallet filtering logic identifies adjacent bin pallets based on the relative position of pallets to vertical steel bars in the images.

The system filters/removes adjacent bin pallet tag detections (reducing false positives by seventy percent).

Alternatively, or in addition to the other examples described herein, examples include any combination of the following:

- assign a start type to a first vertical bar, the first vertical bar defining a first side of a target compartment in the plurality of compartments;
- identify a first adjacent compartment located to a left side of the first vertical bar, the first adjacent compartment comprising the set of adjacent items, wherein the set of adjacent items are removed from the plurality of items identified within the image;
- assign an end type to a second vertical bar in the plurality of vertical members, the second vertical bar defining a second side of the target compartment;
- filter a first set of adjacent items located to a left side of the first vertical member;
- filter a second set of adjacent items located to a right side of the second vertical member, wherein the set of target items includes at least one item in the plurality of items remaining after filtering the first set of adjacent items and the second set of adjacent items;
- identify a third vertical bar in the plurality of vertical members and assign an unused type to the third vertical bar;
- wherein the plurality of compartments comprises a plurality of display cases, wherein the plurality of vertical members comprises a plurality of display doors;
- select a target display door within the plurality of display doors, wherein the second set of items comprises at least one item within the target compartment associated with the target display door;
- identify a set of adjacent display doors within the plurality of display doors, wherein the set of adjacent items comprises as least one item within a set of compartments associated with the set of adjacent display doors, wherein the set of adjacent items are filtered from the plurality of items;
- obtain a location identifier (ID) associated with a location of the target compartment from a location tag associated with the target display door, wherein the set of target items are mapped to the location of the target compartment corresponding to the location ID of the target display door; train the vertical member detection model using labeled training data, the labeled training data comprising images of a plurality of vertical members identified by a plurality of bounding boxes, wherein each vertical member in the plurality of vertical members is enclosed within a bounding box;

track a first vertical member and a second vertical member within the plurality of vertical members associated with the target compartment in each image within a plurality of images in an image sequence generated by the image capture device, wherein tracking the first vertical member and the second vertical member enables consistent mapping of contents of the target compartment to the location of the target compartment;

obtaining an image of an item storage structure comprising a plurality of compartments, the plurality of compartments comprising a plurality of items;

identifying a plurality of vertical members associated with the item storage compartment by a vertical member detection model using the image, the plurality of vertical members defining the plurality of compartments;

selecting a vertical member from the plurality of vertical members associated with a target compartment;

filtering a set of adjacent items located to a selected side of the selected vertical member within the image, wherein the set of adjacent items are associated with an adjacent compartment;

mapping a set of target items associated with the target compartment to a location of the target compartment in an item-to-location mapping table;

identifying a set of item identifiers (IDs) associated with the set of target items using optical character recognition (OCR);

adding the set of item IDs to the location of the target compartment;

identifying a second vertical member from the plurality of vertical members associated with the target compartment, wherein the first vertical member is a start type vertical steel bar, and wherein the second vertical member is an end type vertical steel bar;

filtering a first set of adjacent items located to a left side of the first vertical member and filtering a second set of adjacent items located to a right side of the second vertical member within the image, wherein the first set of adjacent items are associated with a first adjacent compartment and wherein the second set of adjacent items are associated with a second adjacent compartment, wherein the second set of adjacent items comprises at least one pallet located within the target compartment;

identifying a third vertical bar in the plurality of vertical members and assigning an unused type to the third vertical bar, wherein the third vertical member associated with the unused type is disregarded;

selecting a target display door within the plurality of display doors, wherein the set of target items comprises at least one item within the target compartment associated with the target display door;

identifying a first adjacent display door within the plurality of display doors located to a left side of the target display door, wherein the set of target items comprises as least one item within a first adjacent compartment associated with the first adjacent display door, wherein the set of adjacent items are filtered from the plurality of items;

obtaining a location identifier (ID) associated with a location of the target compartment from a location tag associated with the target display door, wherein the set of adjacent items is mapped to the location of the target compartment corresponding to the location ID of the target display door;

identifying a second adjacent display door within the plurality of display doors located to a right side of the target display door, the second display door associated with a second adjacent compartment containing a second set of adjacent items and filtering the second set of adjacent items from the plurality of items;

tracking the target display door within each image in a plurality of images generated by the image capture device, wherein the plurality of images is captured within an image sequence during a predetermined period of time;

filtering items associated with adjacent compartments detected within the plurality of images, wherein the target display door tracking enabled more accurate item-to-location mapping;

identify a plurality of items associated with a plurality of item identifiers (IDs) within a plurality of images of an item storage structure, the plurality of images generated by an image capture device;

identify a plurality of vertical members associated with the item storage compartment within the plurality of images, the plurality of vertical members defining a plurality of compartments of the item storage structure;

select a first vertical member within the plurality of vertical members associated with a target compartment;

filter a set of adjacent items located to a selected side of the first vertical member from the plurality of items, the set of adjacent items associated with an adjacent compartment in the plurality of compartment;

map a set of target items associated with the target compartment to a location of the target compartment in an item-to-location mapping table;

identify a second vertical member within the plurality of vertical members, wherein the first vertical member is a start type vertical steel bar, and wherein the second vertical member is an end type vertical steel bar;

filter a first set of adjacent items located to a left side of the first vertical member;

filter a second set of adjacent items located to a right side of the second vertical member from the plurality of items;

assign a start type to the first vertical member; assign an end type to a second vertical member associated with the target compartment; and assign an unused type to a third vertical member in the plurality of vertical members;

wherein the plurality of compartments comprises a plurality of display cases, wherein the plurality of vertical members comprises a plurality of display doors;

select a target display door within the plurality of display doors, wherein the second set of items comprises at least one item within the target compartment associated with the target display door;

identify a set of adjacent display doors within the plurality of display doors, wherein the set of adjacent items comprises as least one item within a set of compartments associated with the set of adjacent display doors, wherein the set of adjacent items are filtered from the plurality of items;

obtain a location identifier (ID) associated with a location of the target compartment from a location tag associated with the target display door, wherein the set of target items are mapped to the location of the target compartment corresponding to the location ID of the target display door;

identify a pallet located in the first adjacent compartment;

remove a pallet tag ID associated with the pallet from the plurality of item IDs to reduce false positives; and estimate an item layout within a retail environment using the item-to-location mapping, the item layout comprising pallet positioning and bin occupancy information.

At least a portion of the functionality of the various elements in FIG. 1, FIG. 2, FIG. 3, FIG. 4, FIG. 5, FIG. 6 and FIG. 7 can be performed by other elements in FIG. 1, FIG. 2, FIG. 3, FIG. 4, FIG. 5, FIG. 6 and FIG. 7, or an entity (e.g., processor 106, web service, server, application program, computing device, etc.) not shown in FIG. 1, FIG. 2, FIG. 3, FIG. 4, FIG. 5, FIG. 6 and FIG. 7.

In some examples, the operations illustrated in FIG. 8, FIG. 9, FIG. 10, FIG. 11, and FIG. 12 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of adjacent item filtering, the method comprising obtaining an image of an item storage structure comprising a plurality of compartments, the plurality of compartments comprising a plurality of items; identifying a plurality of vertical members associated with the item storage compartment by a vertical member detection model using the image, the plurality of vertical members defining the plurality of compartments; selecting a vertical member from the plurality of vertical members associated with a target compartment; filtering a set of adjacent items located to a selected side of the selected vertical member within the image, wherein the set of adjacent items are associated with an adjacent compartment; and mapping a set of target items associated with the target compartment to a location of the target compartment in an item-to-location mapping table.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for object tracking and adjacent item filtering. For example, the elements illustrated in FIG. 1, FIG. 2, FIG. 3, FIG. 4, FIG. 5, FIG. 6 and/or FIG. 7, such as when encoded to perform the operations illustrated in FIG. 8 FIG. 9, FIG. 10, FIG. 11 and FIG. 12, constitute exemplary means for identifying a plurality of item identifiers (IDs) associated with the plurality of items by a tag detection model using the image; exemplary means for identify a plurality of vertical members associated with the item storage compartment by a vertical member detection model using the image, the plurality of vertical members defining a plurality of compartments of the item storage structure, the plurality of compartments comprising a target compartment; exemplary means for selecting a vertical member in the plurality of vertical members associated with a target compartment; exemplary means for identifying a set of adjacent items located to a selected side of the selected vertical member; exemplary means for filtering the set of adjacent items from the plurality of items, wherein the set of adjacent items are located within an adjacent compartment in the plurality of compartments; and exemplary means for mapping a set of target items within the plurality of items remaining after filtering to a location of the target compartment, the set of target items mapped to the location of the target compartment in an item-to-location mapping table.

Other non-limiting examples provide one or more computer storage devices having a first computer-executable instructions stored thereon for providing object tracking and adjacent item filtering. When executed by a computer, the computer performs operations including identifying a plurality of items associated with a plurality of item identifiers (IDs) within a plurality of images of an item storage structure, the plurality of images generated by an image capture device; identifying a plurality of vertical members associated with the item storage compartment within the plurality of images, the plurality of vertical members defining a plurality of compartments of the item storage structure; selecting a first vertical member within the plurality of vertical members associated with a target compartment; filtering a set of adjacent items located to a selected side of the first vertical member from the plurality of items, the set of adjacent items associated with an adjacent compartment in the plurality of compartment; and mapping a set of target items associated with the target compartment to a location of the target compartment in an item-to-location mapping table.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" only one of or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

an image capture device generating an image of an item storage structure comprising a plurality of items;

a processor; and a memory storing programming instructions for execution by the processor, the programming instructions, upon execution by the processor, causing the processor to:

identify a plurality of item identifiers (IDs) associated with the plurality of items by a tag detection model using the image;

identify a plurality of vertical members associated with the item storage structure by a vertical member detection model using the image, the plurality of vertical members defining a plurality of compartments of the item storage structure, the plurality of compartments comprising a target compartment;

select a vertical member in the plurality of vertical members associated with the target compartment;

identify a set of adjacent items located to a selected side of the selected vertical member;

filter the set of adjacent items from the plurality of items, wherein the set of adjacent items are located within an adjacent compartment in the plurality of compartments; and map a set of target items within the plurality of items remaining after filtering to a location of the target compartment, the set of target items mapped to the location of the target compartment in an item-to-location mapping table.

2. The system of claim 1, wherein the plurality of vertical members comprises a first vertical bar, and wherein the programing instructions further cause the processor to:

assign a start type to the first vertical bar, the first vertical bar defining a first side of the target compartment in the plurality of compartments; and identify a first adjacent compartment located to a left side of the first vertical bar, the first adjacent compartment comprising the set of adjacent items, wherein the set of adjacent items are removed from the plurality of items identified within the image.

3. The system of claim 2, wherein the selected vertical member is a first vertical member, and wherein the programing instructions further cause the processor to:

assign an end type to a second vertical bar in the plurality of vertical members, the second vertical bar defining a second side of the target compartment; and filter a first set of adjacent items located to the left side of the first vertical member; and filter a second set of adjacent items located to a right side of the second vertical bar, wherein the set of target items includes at least one item in the plurality of items remaining after filtering the first set of adjacent items and the second set of adjacent items.

4. The system of claim 3, wherein the programing instructions further cause the processor to:

identify a third vertical bar in the plurality of vertical members; and assign an unused type to the third vertical bar.

5. The system of claim 1, wherein the plurality of compartments comprises a plurality of display cases, wherein the plurality of vertical members comprises a plurality of display doors, and wherein the programing instructions further cause the processor to:

select a target display door within the plurality of display doors, wherein the set of target items comprises at least one item within the target compartment associated with the target display door;

identify a set of adjacent display doors within the plurality of display doors, wherein the set of adjacent items comprises as least one item within a set of compartments associated with the set of adjacent display doors, wherein the set of adjacent items are filtered from the plurality of items; and obtain a location identifier (ID) associated with a location of the target compartment from a location tag associated with the target display door, wherein the set of target items are mapped to the location of the target compartment corresponding to the location ID of the target display door.

6. The system of claim 1, wherein the programing instructions further cause the processor to:

train the vertical member detection model using labeled training data, the labeled training data comprising images of the plurality of vertical members identified by a plurality of bounding boxes, wherein each vertical member in the plurality of vertical members is enclosed within a bounding box.

7. The system of claim 1, wherein the programing instructions further cause the processor to:

track a first vertical member and a second vertical member within the plurality of vertical members associated with the target compartment in each image within a plurality of images in an image sequence generated by the image capture device, wherein tracking the first vertical member and the second vertical member enables consistent mapping of contents of the target compartment to the location of the target compartment.

8. A method comprising:

obtaining an image of an item storage structure comprising a plurality of compartments, the plurality of compartments comprising a plurality of items;

identifying a plurality of vertical members associated with the item storage structure by a vertical member detection model using the image, the plurality of vertical members defining the plurality of compartments;

selecting a vertical member from the plurality of vertical members associated with a target compartment;

filtering a set of adjacent items located to a selected side of the selected vertical member within the image, wherein the set of adjacent items are associated with an adjacent compartment; and mapping a set of target items associated with the target compartment to a location of the target compartment in an item-to-location mapping table.

9. The method of claim 8, further comprising:

identifying a set of item identifiers (IDs) associated with the set of target items using optical character recognition (OCR); and adding the set of item IDs to the location of the target compartment.

10. The method of claim 9, wherein the selected vertical member is a first vertical member, and wherein the method further comprises:

identifying a second vertical member from the plurality of vertical members associated with the target compartment, wherein the first vertical member is a start type vertical steel bar, and wherein the second vertical member is an end type vertical steel bar;

filtering a first set of adjacent items located to a left side of the first vertical member; and filtering a second set of adjacent items located to a right side of the second vertical member within the image, wherein the first set of adjacent items are associated with a first adjacent compartment and wherein the second set of adjacent items are associated with a second adjacent compartment, wherein the second set of adjacent items comprises at least one pallet located within the target compartment.

11. The method of claim 8, further comprising:

identifying a third vertical bar in the plurality of vertical members; and assigning an unused type to the third vertical bar, wherein the third vertical bar associated with the unused type is disregarded.

12. The method of claim 8, wherein the plurality of compartments comprises a plurality of display cases, wherein the plurality of vertical members comprises a plurality of display doors, and wherein the method further comprises:

selecting a target display door within the plurality of display doors, wherein the set of target items comprises at least one item within the target compartment associated with the target display door;

identifying a first adjacent display door within the plurality of display doors located to a left side of the target display door, wherein the set of target items comprises as least one item within a first adjacent compartment associated with the first adjacent display door, wherein the set of adjacent items are filtered from the plurality of items; and obtaining a location identifier (ID) associated with a location of the target compartment from a location tag associated with the target display door, wherein the set of adjacent items is mapped to the location of the target compartment corresponding to the location ID of the target display door.

13. The method of claim 12, further comprising:

identifying a second adjacent display door within the plurality of display doors located to a right side of the target display door, the second adjacent display door associated with a second adjacent compartment containing a second set of adjacent items; and filtering the second set of adjacent items from the plurality of items.

14. The method of claim 12, further comprising:

tracking the target display door within each image in a plurality of images generated by an image capture device, wherein the plurality of images is captured within an image sequence during a predetermined period of time; and filtering items associated with adjacent compartments detected within the plurality of images, wherein the target display door tracking enabled more accurate item-to-location mapping.

15. A non-transitory computer-readable medium comprising instructions that, upon execution by a processor, cause the processor to:

identify a plurality of items associated with a plurality of item identifiers (IDs) within a plurality of images of an item storage structure, the plurality of images generated by an image capture device;

identify a plurality of vertical members associated with the item storage structure within the plurality of images, the plurality of vertical members defining a plurality of compartments of the item storage structure;

select a first vertical member within the plurality of vertical members associated with a target compartment;

filter a set of adjacent items located to a selected side of the first vertical member from the plurality of items, the set of adjacent items associated with an adjacent compartment in the plurality of compartments; and map a set of target items associated with the target compartment to a location of the target compartment in an item-to-location mapping table.

16. The non-transitory computer-readable medium of claim 15, wherein the instructions further cause the processor to:

identify a second vertical member within the plurality of vertical members, wherein the first vertical member is a start type vertical steel bar, and wherein the second vertical member is an end type vertical steel bar;

filter a first set of adjacent items located to a left side of the first vertical member; and filter a second set of adjacent items located to a right side of the second vertical member from the plurality of items.

17. The non-transitory computer-readable medium of claim 15, wherein the instructions further cause the processor to:

assign a start type to the first vertical member;

assign an end type to a second vertical member associated with the target compartment;

assign an unused type to a third vertical member in the plurality of vertical members; and disregard all vertical members assigned the unused type.

18. The non-transitory computer-readable medium of claim 15, wherein the plurality of compartments comprises a plurality of display cases, wherein the plurality of vertical members comprises a plurality of display doors, and wherein the instructions further cause the processor to:

select a target display door within the plurality of display doors, wherein the set of target items comprises at least one item within the target compartment associated with the target display door;

identify a set of adjacent display doors within the plurality of display doors, wherein the set of adjacent items comprises as least one item within a set of compartments associated with the set of adjacent display doors, wherein the set of adjacent items are filtered from the plurality of items; and obtain a location identifier (ID) associated with a location of the target compartment from a location tag associated with the target display door, wherein the set of target items are mapped to the location of the target compartment corresponding to the location ID of the target display door.

19. The non-transitory computer-readable medium of claim 15, wherein the plurality of items comprises a plurality of pallets, and wherein the instructions further cause the processor to:

identify a pallet located in a first adjacent compartment; and remove a pallet tag ID associated with the pallet from the plurality of item IDs to reduce false positives.

20. The non-transitory computer-readable medium of claim 15, wherein the instructions further cause the processor to:

estimate an item layout within a retail environment using item-to-location mapping, the item layout comprising pallet positioning and bin occupancy information.

* * * * *